Patented June 15, 1954

2,681,343

UNITED STATES PATENT OFFICE 2,681,343

5-n-HEPTYL-2-THIOHYDANTOIN AND ITS PREPARATION

Ernest J. Froelich, Albany, N. Y., assignor to Sterling Drug Inc., New York, N. Y., a corporation of Delaware No Drawing. Application April 15, 1952, Serial No. 282,463

3 Claims. (Cl. 260—309.5)

This invention relates to 5-n-heptyl-2-thiohydantoin and to its preparation. This compound, in either the acid or the salt form, is useful as a pharmaceutical agent, in particular, for its antitubercular properties.

This compound can be prepared by heating 2-aminononanoic acid with a water-soluble inorganic thiocyanate and a lower alkanoic acid anhydride, preferably in the presence of a lower alkanoic acid, and thereafter deacylating the resulting 1-acyl-5-n-heptyl-2-thiohydantoin by heating it with a strong base or a strong mineral acid to remove the 1-acyl group. From the standpoint of convenience, accessibility and economy, acetic anhydride and acetic acid are preferred as the lower alkanoic acid anhydride and lower alkanoic acid, respectively; hydrochloric acid, as the strong mineral acid; sodium hydroxide, as the strong base; and ammonium thiocyanate, as the water-soluble inorganic thiocyanate. The compound of my invention can be prepared in the absence of a lower alkanoic acid, e. g., acetic acid, although less desirably.

My invention is further illustrated as follows:

5-n-heptyl-2-thiohydantoin

A mixture containing 51.9 g. of 2-aminononanoic acid, 40 g. of ammonium thiocyanate, 180 ml. of acetic anhydride and 20 ml. of acetic acid was refluxed for twenty minutes and then poured into 1500 ml. of ice water to hydrolyze the unreacted acetic anhydride. The aqueous solution was extracted several times with chloroform—to take up the 1-acetyl-5-n-heptyl-2-thiohydantoin—and the chloroform removed from the extract by distilling in vacuo. The residual material—1 - acetyl - 5 - n - heptyl - 2 - thiohydantoin—was combined with a mixture of 133 ml. each of ethanol, water and concentrated hydrochloric acid; and the resulting solution was refluxed for forty minutes. The solution was then allowed to cool and was chilled in an ice bath, whereupon the product separated. The product was collected, washed with water and recrystallized from ethanol with charcoaling (decolorizing charcoal added to ethanolic solution and hot solution filtered). A second recrystallization from ethanol yielded 35.3 g. (55%) of 5-n-heptyl-2-thiohydantoin, M. P. 130.0–131.6° C. when dried at 70° C. overnight.

Anal. Calcd. for $C_{10}H_{18}N_2OS$: N, 13.07; S, 14.96. Found: N, 12.93; S, 14.89.

The above procedure was modified by omitting the chloroform extraction, that is, by adding concentrated hydrochloric acid to the reaction mixture after it has been added to the ice water, refluxing the resulting acidic solution and proceeding as above. The product, 5-n-heptyl-2-thiohydantoin, was also crystallized satisfactorily from 50% aqueous acetic acid.

Instead of using ammonium thiocyanate in the above procedure, there can be used an equivalent amount of sodium thiocyanate, potassium thiocyanate, calcium thiocyanate, or other water-soluble thiocyanate salt.

The deacetylation can also be effected by heating the 1-acetyl-5-n-heyptyl-2-thiohydantoin with a slight excess of aqueous sodium hydroxide.

The 5-n-heptyl-2-thiohydantoin of my invention can be used either in the free acid form or in the form of its salts with relatively non-toxic cations such as sodium, potassium, calcium, magnesium, ammonium, ethanolammonium, etc.

The usefulness of 5-n-heptyl-2-thiohydantoin was established in repeated experiments in Swiss mice, which were infected intravenously with large inocula of virulent human-type tubercle bacilli. The oral administration of the compound resulted in considerably prolonged survival time, absence or suppression of tuberculous lesions in the lungs, and in inhibiting the multiplication of tubercle bacilli. The compound was found to be well tolerated by various species of laboratory animals. The calculated oral $LD_{50}$ (5 days' medication) in mice is greater than 4000 mg./kg.

I claim:

1. 5-n-heptyl-2-thiohydantoin.
2. The process of preparing 5-n-heptyl-2-thiohydantoin which comprises heating 2-aminononanoic acid with a water-soluble inorganic thiocyanate and a lower alkanoic acid anhydride and thereafter deacylating the resulting 1-acyl-5-n-heptyl-2-thiohydantoin.
3. The process of preparing 5-n-heptyl-2-thiohydantoin which comprises heating 2-aminononanoic acid with a water-soluble inorganic thiocyanate and acetic anhydride and thereafter deacetylating the resulting 1-acetyl-5-n-heptyl-2-thiohydantoin.

References Cited in the file of this patent

Jackman et al.: JACS, vol. 70, pp. 2884–86.